July 3, 1973  R. A. STEINHARDT  3,743,591
ION-SELECTIVE MICROELECTRODE
Filed April 5, 1971
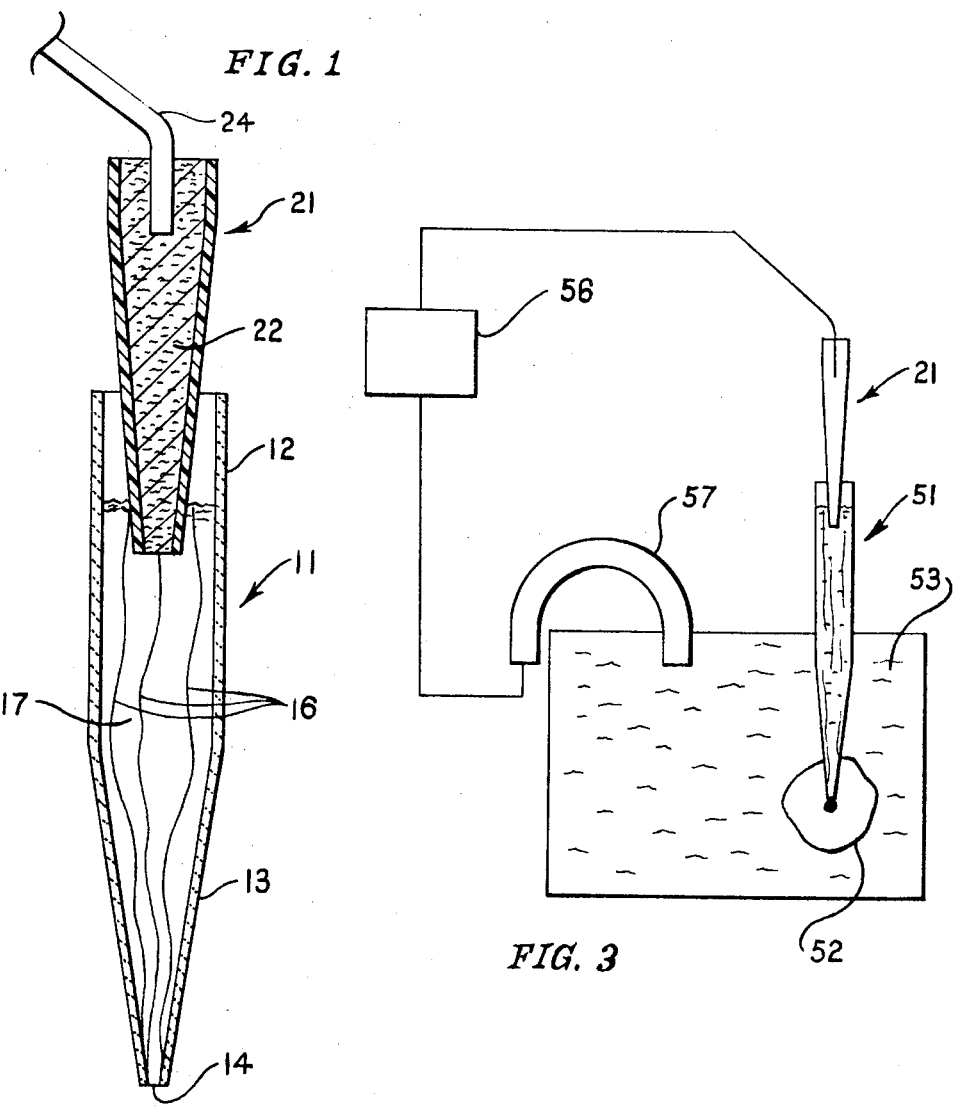
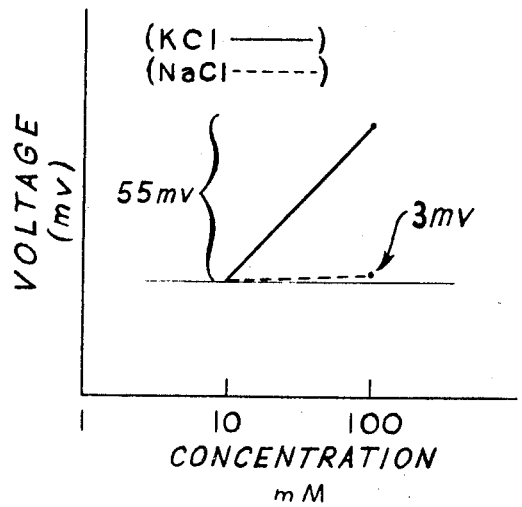
INVENTOR.
RICHARD A. STEINHARDT
BY
Gregg, Hendricson & Caplan
ATTORNEYS

United States Patent Office 3,743,591
Patented July 3, 1973

3,743,591
ION-SELECTIVE MICROELECTRODE
Richard A. Steinhardt, Berkeley, Calif., assignor to The Regents of the University of California, Berkeley, Calif.
Filed Apr. 5, 1971, Ser. No. 130,928
Int. Cl. G01n 27/46
U.S. Cl. 204—195 L        4 Claims

ABSTRACT OF THE DISCLOSURE

An ion-selective microelectrode adapted for insertion into living cells. A very fine glass capillary tube is drawn to a hollow point with minute glass fibers in the tube and an ion exchange liquid in the tube extends from the open point a substantial distance into the tube. The electrode is calibrated by use of a reference liquid carried in a solid porous material placed in contact with the ion exchange liquid and removed after calibration to provide a device with long shelf life.

BACKGROUND OF INVENTION

It is known to employ liquid ion exchangers in medical research for determining the concentration of various elements in particular portions of the body. The term "microelectrode" has, in fact, been employed for devices utilized in this connection but, in order to insert such an electrode into a living cell, it is necessary to form the device with an extremely small opening at the point thereof. In general, devices that in the past have been termed microelectrodes have a point diameter of the order of a few microns, possibly as small as 1 micron. The present invention provides a device having a much smaller or sharper point wherein the diameter of the point is of the order of ½ micron. Thus to employ proper terminology, prior art devices of this general type should preferably be termed "macroelectrodes" in distinction to the true microelectrode of the present invention.

Ion-selective electrodes require calibration to insure that they do have a stable slope of voltage change vs. ion concentration. In general, it is expected that there will be achieved a 58–59 millivolt reading per 10 fold change in concentration of a predetermined ion to be measured. The present invention as applied to potassium chloride gives a stable slope of the order of 55 millivolts per 10 fold change in potassium concentration, and this has been found to be wholly satisfactory.

One of the major problems in the production of a true microelectrode for determining ion concentration, for example, is the difficulty in placing the ion selective liquid in the tube. Ion selective liquids are highly viscous and in fact they are oftentimes termed "oils." While it is conventional to place liquids in drawn capillary tubes by condensing the liquid in the tube, this approach is not readily applicable to the type of liquid employed as ion-selective exchangers. The very small dimensions of the interior of a microelectrode makes it almost impossible to fill the electrode down to the point from the open back end of the tube. One manner of filling a very small ion selective electrode is described in an article by J. L. Walker, Jr. and A. M. Brown in Science, vol. 167, pp. 1502–1504. As stated in this article, filling of the electrode from the tip end by capillary action produces only a column of the order of 150 microns long in the tube and further filling then is required from the back end of the tube, which requires extreme care. With such a very small amount of liquid in the tube, as is possible with this approach, the solvent in the liquid evaporates from both ends thereof.

It is also necessary in the formation of ion selective microelectrodes to add reference fluid through the back of the tube into contact with the ion selective liquid in the forward portion of the tube. Again difficulty is normally encountered in attempting to insure that this reference fluid does, in fact, actually contact the ion selective liquid.

It is provided by the present invention that the microelectrode hereof shall be so formed that the drawn capillary tube can and shall be filled from the back or relatively open end with a substantial amount of "oil" then being disposed in the tube. Consequently, the present invention provides a sufficient amount of ion selective liquid in the tube that it does not substantially evaporate over a short period of time, and furthermore, the liquid is easy to reach with the reference fluid which, in turn, contacts a sufficient volume of ion selective liquid that only minor contamination of the ion selective liquid results by diffusion of the reference fluid therein.

SUMMARY OF INVENTION

There is provided by the present invention an improved microelectrode structure and process of calibration. Within a small capillary tube there is provided a few, such as 3 or 4, fine glass fibers extending through the tube and the tube is then pulled in a conventional puller to draw the tube down to the very fine cross section which is then severed to form two tapered microelectrodes having an extremely fine cross section at the open points thereof. With these glass fibers within the electrode, it is then possible to fill the electrode from the back or large end, preferably after treating the open tip with a silane agent in solvent. The glass fibers which may have an original diameter of the order of $20\mu$ are also drawn at the same time the tube is drawn and provide a path for the liquid to flow down into the very fine point of the tube. The resultant electrode is fully operable even if bubbles remain in the tube.

The process of calibrating the ion-selective microelectrode of the present invention provides for impregnating a porous solid mass with a reference liquid as is normally employed in connection with the ion-selective liquid in the electrode. This mass is placed in a second capillary tube having an open pointed end and is inserted in the rear or shank of the microelectrode to extend the open point into the ion-selective liquid in the electrode. Calibration is then accomplished in a conventional manner and the second tube is then withdrawn from the electrode. The microelectrode is then in condition to be shipped or stored substantially without deterioration of the ion-selective liquid therein. At such time as the electrode is to be used a reference liquid is then added to the back open end of the electrode to come in contact with the ion-selective liquid therein.

DESCRIPTION OF FIGURES

The present invention is illustrated as to a single preferred embodiment thereof and a manner of usage in the accompanying drawings wherein:

FIG. 1 is a central longitudinal sectional view taken through a preferred embodiment of the present invention;

FIG. 2 is a plot of microelectrode calibration; and

FIG. 3 is a schematic illustration of the present invention in use.

DESCRIPTION OF PREFERRED EMBODIMENT

The microelectrode of the present invention comprises a fine glass tube such as a capillary tube 11 having a shank 12 and a tapered portion 13 extending to a very fine point 14. The tube 11 is open at both ends with the pointed end having a diameter of the order of 0.5 micron. Within the tube 11 there are provided a number of fine glass fibers 16 such as, for example, 2 to 5 fibers. These fibers 16 extend through the tube from the shank thereof substantially to the point 14. The tube 11 is formed in the configuration described and illustrated by conventional equipment (pipette puller) wherein a capillary tube is placed in a device which grips same and heats the center of the tube as the ends are slowly pulled apart. In practice the fine glass fibers 16 are placed in the tube prior to pulling of same and it has been found that, by proceeding in this manner the fibers are also drawn as the tube is drawn and actually extend substantially to the tube point where they are fused to the wall of the tube adjacent the opening at the point.

The tube 11 contains an ion-selective liquid 17 which extends from well into the shank 12 completely to the tube opening at the point 14. A variety of different ion-selective liquids or liquid ion exchangers are known in the art and are, in fact, commercially available such as, for example, Corning No. 477,317, which is a potassium liquid ion exchanger. Inasmuch as the composition and use of liquid ion exchangers are well known in the art, no detailed description thereof is included herein other than to note that the liquid resembles an oil and is, in fact, oftentimes termed an oil.

Considering further the tube 11, it is noted that placement of a viscous liquid, such as an oil, in the tube in extension completely to the fine point 14 poses considerable difficulty. A procedure sometimes termed "the Walker method" is set forth in the above-noted publication "Science." However, this method is acknowledged to require particular dexterity. The present invention, on the other hand, provides for back filling of the tube, i.e., application of the liquid through the open end of the shank of the tube. The very fine glass fibers 16 within the tube provide low resistance paths for even a viscous fluid to flow into the tapered portion of the tube and completely fill same down to the opening in the point 14. Consequently, it is herein provided that the tube may be readily and simply charged with a liquid ion exchanger from the point up into the shank with a substantial volume of liquid and without prior art difficulties.

The present invention furthermore provides for treatment of the tip or point of the tube with a silane agent. This treatment is provided for the purpose of reducing the normal negative potential of the glass of which the tube is formed, which would make the tube selective to positive ions. It is, of course, important in liquid ion exchange operations to minimize extraneous potentials in the system inasmuch as the measured potentials are extremely small. Thus some 100 to 400 microns length of the tube from the tip or point thereof is treated or coated with a silane agent such as tri-N-butylchlorosilane which may be considered as a water-repellant agent to minimize electrical leakage along the glass and thus maximize the current path through the liquid.

Considering now a procedure for forming the microelectrode briefly described above, it is noted that a fine capillary tube is first washed in hot 0.1 $HNO_3$ for ½ hour or boiled for 15 minutes, after which it is rinsed in distilled water. The tube is then boiled in 95% ethanol for 15 minutes and dried as, for example, in an incubator. The glass fibers are rinsed in hot ethanol for 5 to 10 minutes and then dried. A number of glass fibers such as 3 to 4 fibers are placed in the capillary tube as, for example, by air suction. The tube is then pulled or drawn at the desired setting on conventional equipment to form the tube shape illustrated and described above. The tip of the tube 11 is then dipped in a 5% silane solution such as tri-N-butylchlorosilane in 1-chloronaphthalene and after 5 to 30 minutes in this solution is dried in air as, for example, overnight. A liquid ion exchanger 17 is then placed in the tube from the open back end thereof to fill the tube from the point 14 well up into the body or shank 12 of the capillary. This filling procedure is relatively easily accomplished because of the fine glass fibers extending down to the point.

The present invention further comprises method and means for calibrating the microelectrode described to maximize long shelf life of the electrode. As shown in FIG. 1, there is provided a finely drawn tube 21 formed of plastic, for example, and containing a cellulosic or other type of porous non-reactive material 22. This unit 21, which will herein be termed an upper tube, has open ends and the porous material 22 therein is filled with a reference liquid as is generally employed in liquid ion exchange reactions. Conventionally, the tube 11 would have applied to the upper open end thereof a reference liquid and in the example given above of a potassium liquid ion exchanger, such reference liquid might, for example, be 0.5 molar potassium chloride. After contacting this reference liquid with the liquid ion exchanger 17, the unit would then be calibrated to determine the response thereof to different concentrations of potassium in solution. As previously noted, a serious difficulty with this prior art approach is the rapid degrading of the small amount of liquid ion exchanger in the electrode to such an extent that, after a limited period of time such as a day and a half, the entire microelectrode is useless. The present invention proceeds in a wholly alternative manner to accomplish the same results as in the prior art, but without the attendant difficulties.

In accordance with the present invention the upper tube 21 is inserted in the microelectrode 11 through the upper open end thereof so as to place the tip of the upper tube in the liquid ion exchanger 17 of the tube 11. This then provides for a contact between the liquid ion exchanger 17 and the reference liquid held in the porous material 22 of the upper tube. This also provides for removal of the reference liquid merely by removing the upper tube 22 from the microelectrode 11. There is illustrated in FIG. 2 a calibration plot of a potassium selective electrode also showing sodium response.

In order to proceed with calibration of the microelectrode, it is necessary to complete an electrical circuit and to this end there is provided an electrode 24 formed, for example, of silver-silverchloride wire, either mounted within or extended into the porous material 22 in the upper tube 21. This electrode 24 electrically contacts the reference liquid in the porous material so that it is possible to complete an electrical circuit from the electrode 24 through exterior circuitry and a solution to be measured via the point or tip 14 of the microelectrode. Without any attempt to present a complete description of liquid ion exchangers or the reaction thereof, it is noted that calibration of the liquid ion exchanger 17 is required to determine the response thereof, not only to the chemical element to be measured but also to establish the sensitivity and response of the particular microelectrode being calibrated.

By the utilization of a removable reference fluid in contact with the liquid ion exchanger of the microelectrode of the present invention for calibration of same and the provision of a substantial volume of ion exchange liquid, it is possible then to produce a liquid ion exchanger microelectrode which does not deteriorate over a substantial period of time. Consequently, the microelectrode of the present invention is actually suitable for manufacture and sale for use in such fields as biomedical and biological research.

With regard to actual utilization of the microelectrode of the present invention, it is noted that same is relatively conventional. Differences in the present invention over the prior art are to be found primarily in the manner of filling the electrode and calibration thereof. Referring to FIG. 2, there is shown a microelectrode 51 formed in accordance with the present invention and having the tip or point thereof inserted within a living cell 52 disposed in a bath or solution 53. An electrical circuit is completed by contacting the liquid ion exchanger within the microelectrode with a reference fluid as by employing the tube 21 or directly applying a reference fluid in the top or open end of the tube via an electrode through a very high resistance amplifier 56 to one end of a bridge 57 extending into the solution 53. The bridge 57 incorporates an appropriate liquid such as the same liquid as is employed for the reference liquid to thus complete an electrical circuit through the microelectrode from the interior of a living cell 52, and the amplifier 56 includes read-out means so that electrical change in the circuit may be recorded. Insofar as utilization of the present invention is concerned, it is noted that electrical connection to the upper surface of the liquid ion exchanger 17 in the microelectrode may be accomplished merely by the provision of a reference liquid disposed in the top of the tube 11 at the time of use. Under such circumstances, the electrode 24 would then be inserted in such liquid. Alternatively, it is possible to employ the upper tube 21 not only for calibration but also for utilization of the microelectrode.

It is to be appreciated that the present invention provides an ion-selective microelectrode having a sufficiently fine point to be applicable for insertion into a living cell, i.e., the present invention is an intracellular device. Furthermore, it is provided by the present invention that the microelectrode hereof shall be capable of storage without deterioration. Insofar as retention of the ion-selective liquid within the electrode hereof, it will be appreciated by those skilled in the art that capillary action retains the liquid in the electrode. Utilization of a reference liquid contained in a porous solid provides for removal of such reference liquid after calibration of the microelectrode to thus assist in achieving the above-noted long shelf life so necessary to the commercial application of microelectrodes of this type.

Although the present invention has been described above with reference to a single preferred embodiment thereof, it is not intended to limit the invention to the details of description or illustration but, instead, to present same only as exemplary of the invention. Numerous modifications and variations in the present invention as described will be apparent to those skilled in the art.

What is claimed is:
1. An ion-selective microelectrode comprising,
   a fine capillary tube having an open pointed tip with a diameter of 0.5 micron or less,
   a number of fine glass fibers in the range of 2 to 5 extending longitudinally in said tube into close proximity with the open tip thereof, and
   an ion-selective liquid disposed in said tube and extending completely from the open tip into the tube shank.
2. The electrode of claim 1 further defined by the tip of said tube being coated with a silane.
3. The electrode of claim 1 further defined by a porous solid material containing a reference liquid for calibrating said ion-selective liquid and configured with a fine point extending into the tube end opposite the tube tip into contact with the liquid in the tube for calibrating the electrode.
4. The electrode of claim 3 further defined by a second small pointed tube having an open point and containing said porous solid material.

References Cited

UNITED STATES PATENTS

| | | | |
|---|---|---|---|
| 1,944,738 | 1/1934 | Grebe et al. | 204—195 F |
| 3,448,032 | 6/1969 | Settzo et al. | 204—195 L |
| 3,505,196 | 4/1970 | Dahms | 204—195 F |
| 3,530,056 | 9/1970 | Haddad | 204—195 F |
| 3,575,834 | 4/1971 | Hoole et al. | 204—195 F |

OTHER REFERENCES

"Science," vol. 167, March 1970, pp. 1502–1504.
Ives et al., "Reference Electrodes," 1961, pp. 467–476.

TA-HSUNG TUNG, Primary Examiner

U.S. Cl. X.R.

204—1 T